(12) United States Patent
Doi et al.

(10) Patent No.: US 6,616,761 B2
(45) Date of Patent: Sep. 9, 2003

(54) FINELY-DIVIDED POWDER SPRAY APPARATUS

(75) Inventors: Shin Doi, Iruma-gun (JP); Masaki Ban, Iruma-gun (JP); Goro Watanabe, Iruma-gun (JP)

(73) Assignees: Nisshin Seifun Group Inc., Tokyo (JP); Nisshin Engineering Co., Ltd., Tokyo (JP)

( * ) Notice: Subject to any disclaimer, the term of this patent is extended or adjusted under 35 U.S.C. 154(b) by 0 days.

(21) Appl. No.: 09/883,944

(22) Filed: Jun. 20, 2001

(65) Prior Publication Data

US 2002/0017236 A1 Feb. 14, 2002

(30) Foreign Application Priority Data

Aug. 14, 2000 (JP) ........................................ 2000-245655

(51) Int. Cl.$^7$ ............................................... B05C 19/00
(52) U.S. Cl. ...................... 118/308; 118/323; 118/696
(58) Field of Search ................................. 118/308, 323, 118/309, 621, 624, 627, 696, 695

(56) References Cited

U.S. PATENT DOCUMENTS 5,814,368 A * 9/1998 Yamada et al. .............. 118/308
6,190,455 B1    2/2001 Doi et al.

* cited by examiner

*Primary Examiner*—Richard Crispino
*Assistant Examiner*—Yewebdar Tadesse
(74) *Attorney, Agent, or Firm*—Oblon, Spivak, McClelland, Maier & Neustadt, P.C.

(57) ABSTRACT

The present invention provides a finely-divided powder spray apparatus having a spray nozzle pipe for discharging spacers for liquid crystal displays from the tip together with a gas flow, which is disposed at a prescribed distance from a member to be sprayed, and comprising: a touch panel which enters control factors for controlling the moving-speed of the tip of the spray nozzle pipe at individual spray points the surface of the glass substrate; and an actuator driver which controls the moving speed of the tip of the spray nozzle pipe in accordance with the control factor entered by the touch panel.

8 Claims, 10 Drawing Sheets

| 5 | 5 | 5 | 5 | 5 | 5 | 5 | 5 | 5 | 5 | 5 | 5 |
|---|---|---|---|---|---|---|---|---|---|---|---|
| 5 | 5 | 5 | 5 | 5 | 5 | 5 | 5 | 5 | 5 | 5 | 5 |
| 5 | 5 | 5 | 5 | 5 | 5 | 5 | 5 | 5 | 5 | 5 | 5 |
| 5 | 5 | 5 | 5 | 5 | 5 | 5 | 5 | 5 | 5 | 5 | 5 |
| 5 | 5 | 5 | 5 | 5 | 5 | 5 | 5 | 5 | 5 | 5 | 5 |
| 5 | 5 | 5 | 5 | 5 | 5 | 5 | 5 | 5 | 5 | 5 | 5 |
| 5 | 5 | 5 | 5 | 5 | 5 | 5 | 5 | 5 | 5 | 5 | 5 |
| 5 | 5 | 5 | 5 | 5 | 5 | 5 | 5 | 5 | 5 | 5 | 5 |
| 5 | 5 | 5 | 5 | 5 | 5 | 5 | 5 | 5 | 5 | 5 | 5 |
| 5 | 5 | 5 | 5 | 5 | 5 | 5 | 5 | 5 | 5 | 5 | 5 |

FIG. 9

| 230 | 225 | 235 | 246 | 240 | 243 | 259 | 267 | 265 | 255 | 205 | 197 |
|---|---|---|---|---|---|---|---|---|---|---|---|
| 205 | 211 | 229 | 224 | 222 | 212 | 225 | 235 | 221 | 241 | 210 | 191 |
| 193 | 224 | 218 | 234 | 236 | 213 | 207 | 215 | 213 | 219 | 170 | 177 |
| 208 | 209 | 215 | 219 | 220 | 219 | 202 | 212 | 211 | 210 | 183 | 180 |
| 189 | 187 | 204 | 213 | 217 | 220 | 198 | 204 | 202 | 215 | 204 | 176 |
| 189 | 183 | 207 | 219 | 206 | 212 | 201 | 203 | 201 | 202 | 194 | 191 |
| 196 | 190 | 189 | 205 | 219 | 214 | 195 | 204 | 200 | 225 | 214 | 211 |
| 205 | 179 | 191 | 193 | 229 | 239 | 234 | 208 | 222 | 240 | 217 | 201 |
| 197 | 190 | 197 | 184 | 208 | 208 | 232 | 199 | 211 | 234 | 216 | 202 |
| 198 | 211 | 219 | 242 | 253 | 254 | 250 | 230 | 222 | 220 | 228 | 230 |

| 8 | 8 | 4 | 4 | 4 | 4 | 4 | 4 | 4 | 4 | 8 | 8 |
|---|---|---|---|---|---|---|---|---|---|---|---|
| 8 | 8 | 5 | 5 | 5 | 5 | 5 | 5 | 5 | 5 | 8 | 8 |
| 8 | 8 | 5 | 5 | 5 | 5 | 5 | 5 | 5 | 5 | 8 | 8 |
| 8 | 8 | 5 | 5 | 5 | 5 | 5 | 5 | 5 | 5 | 8 | 8 |
| 8 | 8 | 5 | 5 | 5 | 5 | 5 | 5 | 5 | 5 | 8 | 8 |
| 8 | 8 | 5 | 5 | 5 | 5 | 5 | 5 | 5 | 5 | 8 | 8 |
| 8 | 8 | 5 | 5 | 5 | 5 | 5 | 5 | 5 | 5 | 8 | 8 |
| 8 | 8 | 5 | 5 | 5 | 5 | 5 | 5 | 5 | 5 | 8 | 8 |
| 8 | 8 | 5 | 5 | 5 | 5 | 5 | 5 | 5 | 5 | 8 | 8 |
| 8 | 8 | 4 | 4 | 4 | 4 | 4 | 4 | 4 | 4 | 8 | 8 |

FIG. 12

| 238 | 227 | 250 | 218 | 210 | 220 | 199 | 207 | 203 | 225 | 207 | 199 |
|---|---|---|---|---|---|---|---|---|---|---|---|
| 201 | 193 | 212 | 203 | 214 | 202 | 198 | 198 | 191 | 208 | 206 | 182 |
| 197 | 195 | 209 | 217 | 195 | 220 | 203 | 198 | 198 | 206 | 197 | 188 |
| 205 | 200 | 195 | 189 | 212 | 195 | 201 | 210 | 212 | 209 | 184 | 192 |
| 197 | 191 | 203 | 209 | 209 | 198 | 222 | 205 | 208 | 215 | 200 | 193 |
| 188 | 219 | 210 | 214 | 203 | 216 | 217 | 204 | 193 | 192 | 187 | 187 |
| 236 | 225 | 212 | 227 | 206 | 208 | 211 | 190 | 183 | 213 | 204 | 198 |
| 208 | 240 | 215 | 204 | 199 | 209 | 208 | 210 | 196 | 204 | 187 | 185 |
| 181 | 183 | 204 | 208 | 220 | 210 | 223 | 213 | 192 | 180 | 204 | 186 |
| 226 | 209 | 197 | 201 | 237 | 225 | 202 | 210 | 202 | 201 | 207 | 206 |

FIG. 13

FINELY-DIVIDED POWDER SPRAY APPARATUS

FIELD OF THE INVENTION

The present invention relates to a finely-divided powder spray apparatus for discharging finely-divided powders together with a gas stream so that the powders are sprayed onto a member to be sprayed as a substrate.

BACKGROUND OF THE INVENTION

A spacer spray apparatus is known as a representative example of finely-divided powder spray apparatuses, the apparatus uniformly spraying a prescribed amount of spacers for liquid crystal displays (spacer beads) as the finely-divided powders having a uniform particle size between substrates constituting a liquid crystal display panel for liquid crystal display devices, for example, between a glass substrate and a glass or plastic substrate so that the spacers are formed into a single layer.

In the liquid crystal display panel of a liquid crystal display device and the like, particles (spacer beads such as plastic particles and silica particles) having a uniform particle size of about several microns to several tens of microns are sprayed or coated as spacers as uniformly as possible in an amount of 10 to 2000 particles per unit area of 1 mm$^2$ to form a single layer between substrates, for example, between glass substrates, between plastic (organic glass, etc.) substrates other than the glass substrates, and between the plastic substrate and the glass substrate, (hereinafter the glass substrate will be described as a representative example and the aforementioned member to be sprayed are simply referred to as the glass substrate as a whole) so that the space to charge liquid crystals is formed.

Some conventional spacer spray apparatuses spray spacer particles onto the glass substrate by transporting the fine spacer particles together with a gas flow of air, nitrogen, etc., through a thin pipe (transportation pipe) and discharging the particles from a swinging spray nozzle pipe together with the gas stream. The spacer particles are finely-divided powders having a size of several microns to several tens of microns, and liable to float. They are various types of plastic particles or silica particles, and liable to be charged. Therefore, it is difficult to spray the spacers onto the glass substrate at a prescribed density with excellent repeatability. These apparatuses can charge the spacer particles in accordance with a charged polarity (electrostatic polarity) and ground the glass substrate and a table so as to reliably spray the spacer particles onto the glass substrate at the prescribed density.

SUMMARY OF THE INVENTION

Recently, the size of a liquid crystal display panel has been increased gradually and a plurality of liquid crystal display panels have often been made of a single glass substrate. It is therefore required to fix a larger glass substrate on a table disposed in a chamber of the spacer spray apparatus. In general, the glass substrate is fixed onto the table by vacuuming the substrate from the side of the table. However, the density of the spacers deposited at one spot, where the glass substrate is fixed, is different from the densities at other spots depending on a strength of vacuuming the glass substrate, i.e., the spacers cannot be uniformly sprayed. Further, if a difference in electric field strengths generates on the surface on the glass substrate, the spacers cannot be uniformly sprayed out in some cases.

An object of the present invention is to provide a finely-divided powder spray apparatus which can adjust a density of finely-divided powders such as spacers for liquid crystal displays to be sprayed onto a member such as a glass substrate.

The finely-divided powder spray apparatus of the present invention having a spray nozzle pipe for discharging the finely-divided powders from the tip together with a gas stream, which is disposed at a prescribed distance from a member to be sprayed, and comprising:

a moving-speed control factor entry means which enters moving-speed control factors for controlling a moving-speed of the spray nozzle pipe in a prescribed area of the surface of the member to be sprayed; and a moving-speed control means which controls the moving-speed of the spray nozzle pipe in the prescribed area of the surface of the member to be sprayed, based on the control factor entered by the moving-speed factor entry means.

In the finely-divided powder spray apparatus of the present invention, the moving-speed control factor entry means is provided to enter the moving-speed control factor for each prescribed area on the surface of the member to be sprayed and the moving-speed control means is provided to control the moving-speed of the tip of the spray nozzle pipe depending on the area of a spray point, at which the finely-divided powders are sprayed, based on the control factor entered for the prescribed area.

According to the finely-divided powder spray apparatus of the present invention, the moving-speed factor is entered by the moving-speed control factor entry means for each prescribed area of the member to be sprayed. Based on the result of a test spray, for example, the moving-speed control factor for decreasing the moving-speed of the tip of the spray nozzle pipe is entered for the prescribed area having a lower density of finely-divided powders deposited, whereas a moving-speed control factor for increasing the moving-speed of the tip of the spray nozzle pipe is entered for the prescribed area having a higher density of finely-divided powders deposited. Further, the moving-speed control means controls the moving-speed of the tip of the spray nozzle pipe based on the moving-speed control factor entered by the moving-speed factor entry means, and thus the moving-speed of the tip of the spray nozzle pipe can be controlled in the prescribed area on the surface of the member to be sprayed in order to achieve a uniform density over the whole surface of the member to be sprayed.

DETAILED DESCRIPTION OF THE PREFERRED EMBODIMENTS

A finely-divided powder spray apparatus of the present invention will be described below in detail based on the preferable embodiments shown in the accompanying drawings.

Figure 1:
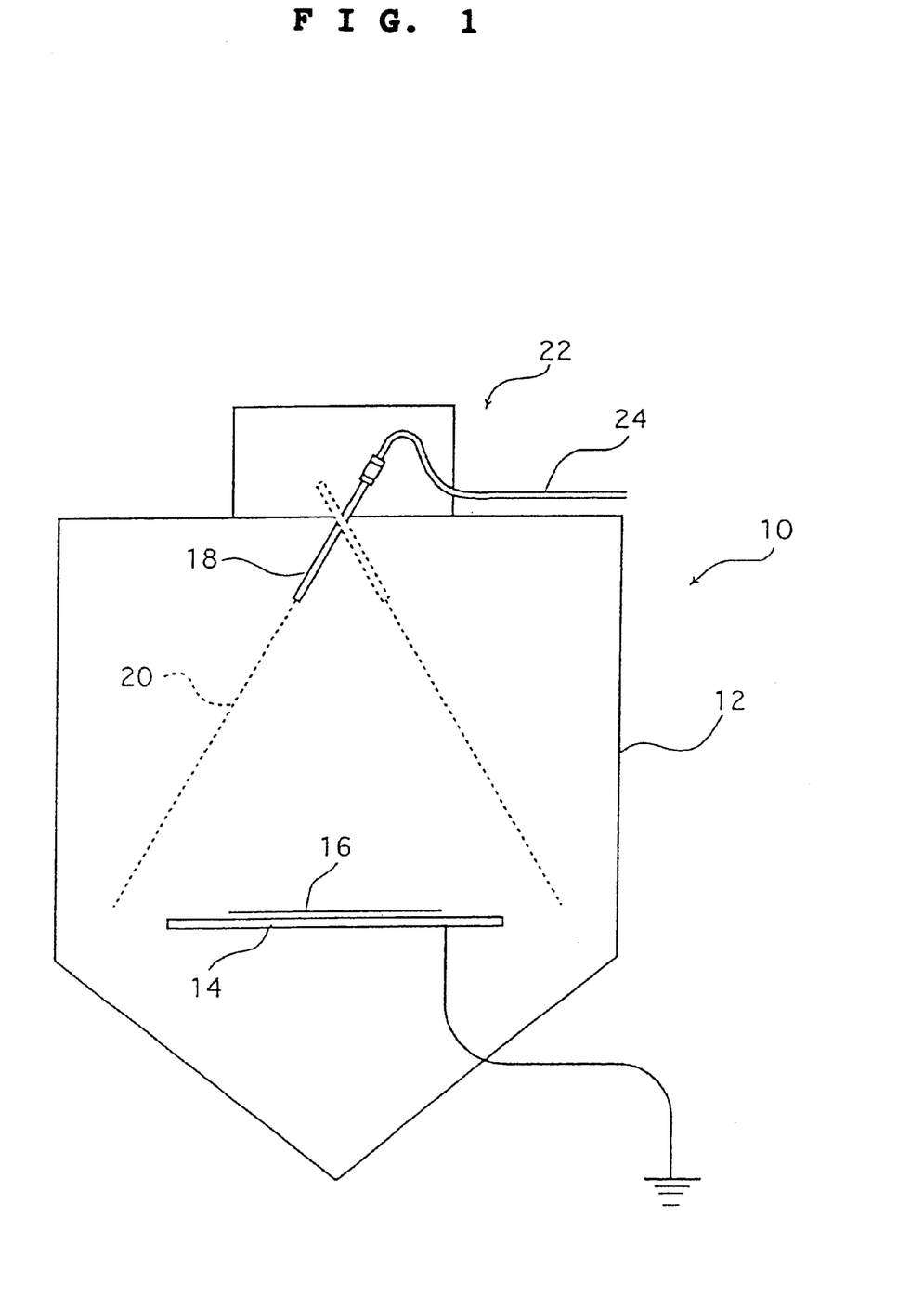
FIG. 1 is a cross-sectional view of a finely-divided powder spray apparatus of the present invention.

FIG. 1 is a sectional view of the finely-divided powder spray apparatus of the present invention.

In the figure, a spacer spray apparatus 10 as the finely-divided powder spray apparatus of the present invention has a glass substrate 16 as a member to be sprayed, which is fixed to a table 14 disposed in a lower portion of a hermetically-sealed chamber 12. The table 14 is grounded and thereby grounds the glass substrate 16 mounted on it so that spacers 20 as charged finely-divided powders are surely deposited on the surface of the grounded glass substrate.

A spray mechanism 22 having a splay nozzle pipe 18 for spraying the spacers 20 is disposed above the table 14. The spray nozzle pipe 18 discharges the spacers 20 transported through a flexible tube 24 together with a gas stream of air, a nitrogen gas, etc. and sprays the spacers 20 onto the glass substrate 16. The spray nozzle pipe 18 can be swung in any of prescribed first direction and second direction perpendicular to the first direction, for example, in any of an X-axis direction and a Y-axis direction. The spray nozzle pipe 18 discharges the spacers 20 together with the gas stream while inclining in a prescribed direction, whereby the spacers 20 can be sprayed out at a prescribed position of the glass substrate 16.

Figure 2:
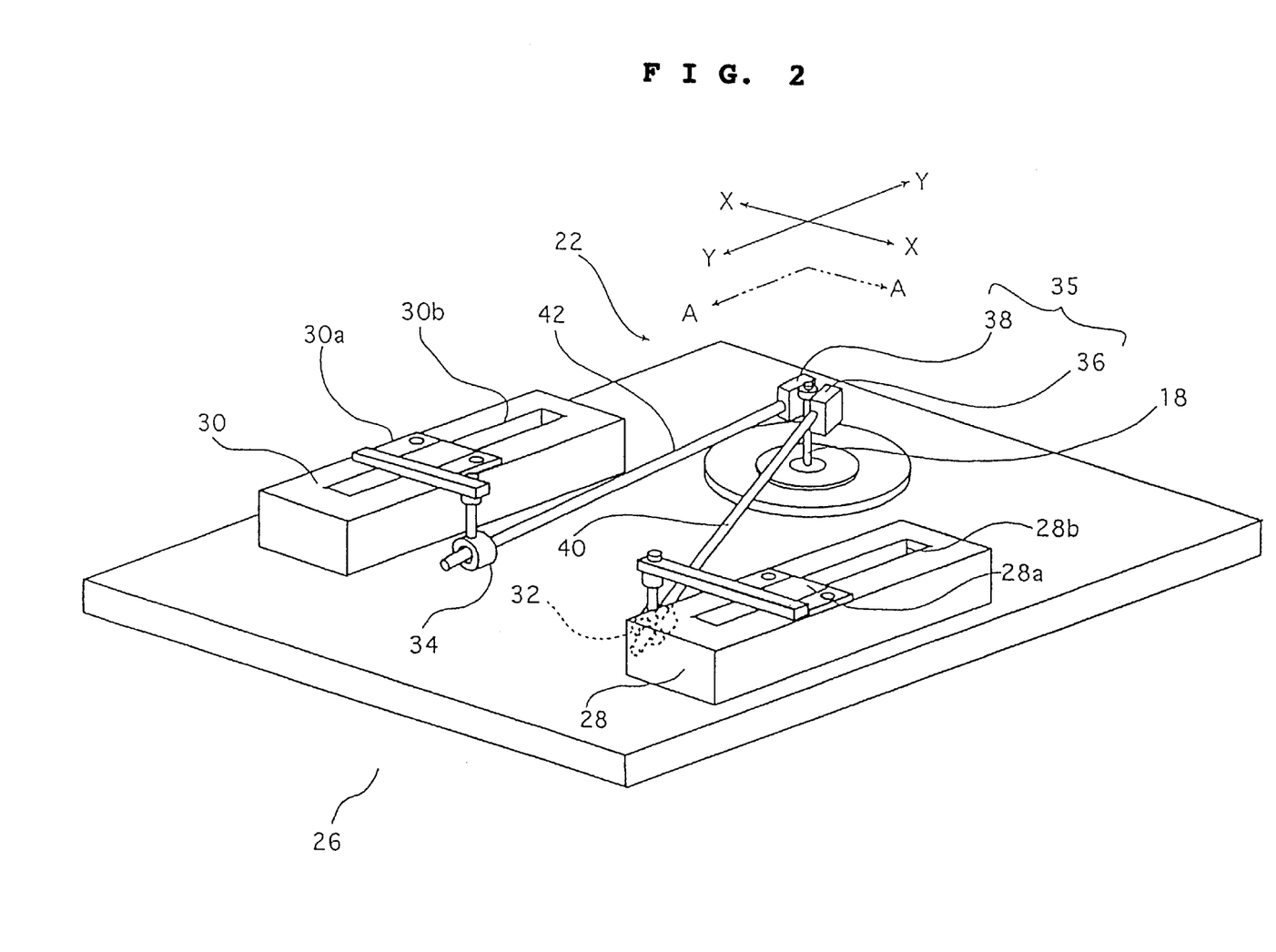
FIG. 2 is a schematic perspective view of a finely-divided powder spray mechanism used for the finely-divided powder spray apparatus of the present invention.

FIG. 2 is a perspective view schematically showing the spray mechanism 22 for the spacers 20 in the spacer spray apparatus 10 of the present invention.

In the figure, the spray mechanism 22 is arranged so that two linearly-moving actuators 28 and 30 are disposed on a mounting table 26 in parallel with each other in the Y-axis direction. Second joint units 32 and 34 composed of adjustable joints (spherical joints) are disposed on the inner sides of the linearly-moving actuators 28 and 30, respectively. The spray nozzle pipe 18 is disposed in back of the two linearly-moving actuators 28 and 30 along the centerline therebetween so that the spray nozzle pipe 18 can be swung in any of the X-axis direction and the Y-axis direction and inclined in an arbitrary direction. The linearly-moving actuators 28 and 30 have sliders 28a and 30a, and guides 28b and 30b disposed in parallel with the Y-axis direction, respectively, wherein the sliders 28a and 30a reciprocate in the Y-axis direction along the guides 28b and 30b, respectively. The linearly-moving actuators used in the present invention are not particularly limited and an AC-servo-driven linear actuator, a linear stepping motor and the like can be used.

A first joint unit 35 is attached to the upper end of the spray nozzle pipe 18. In the figure, adjustable joints (universal joints) 36 and 38, which project toward both the sides in the X-axis direction, are employed as the first joint 35. The second joint units (adjustable joints) 32 and 34, which are disposed on the inner sides of the linearly-moving actuators 28 and 30, are coupled with the adjustable joints 36 and 38 of the first joint unit 35 attached to the upper end of the spray nozzle pipe 18 through two rods 40 and 42, respectively.

Figure 3:
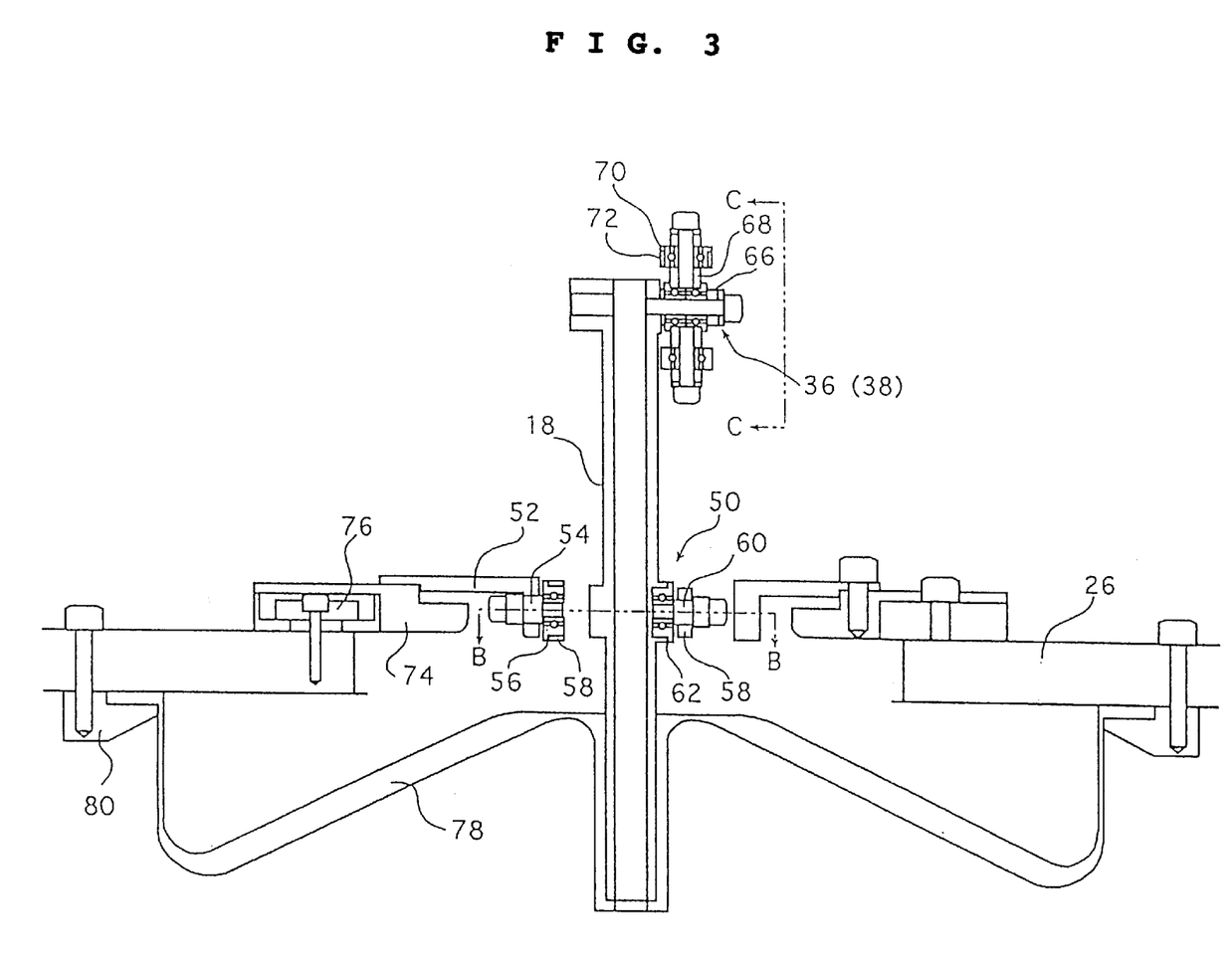
FIG. 3 is a cross-sectional view along the line A—A of FIG. 2 showing in detail a swing mechanism for swinging a spray nozzle pipe in the finely-divided powder spray mechanism of the present invention.
Figure 4:
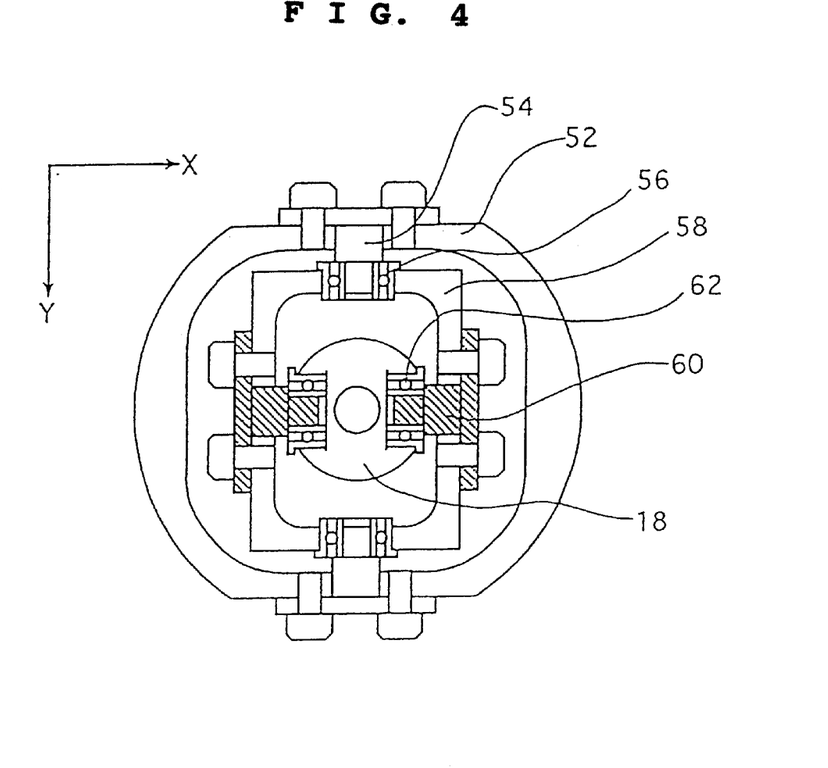
FIG. 4 is a perspective view along the section B—B of FIG. 3 showing the swing mechanism of the present invention.
Figure 5:
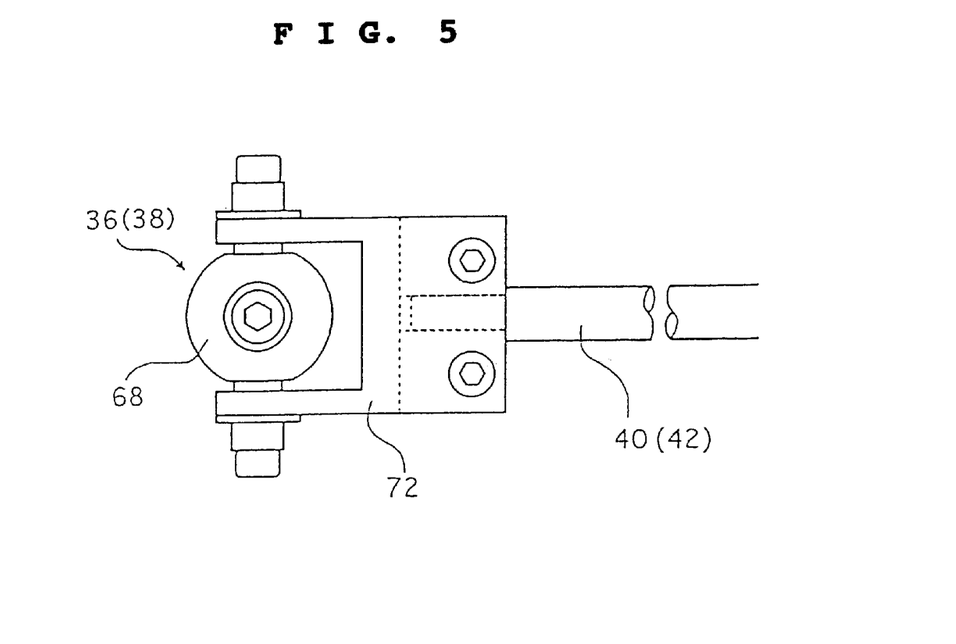
FIG. 5 is a perspective view along the section C—C of FIG. 3 showing the swing mechanism of the present invention.

FIG. 3. is a sectional view along the line A—A of FIG. 2 to show in detail a swing mechanism for swinging the spray nozzle pipe 18. FIG. 4 is a perspective view along the section B—B of FIG. 3 showing the swing mechanism. FIG. 5 is a perspective view along the section C—C of FIG. 3 showing the swing mechanism. The spray nozzle pipe 18 placed at the center in FIG. 3 is composed of a hollow pipe, has the flexible tube 24 (not shown in FIG. 3) connected to the upper end thereof, and discharges the finely-divided powders (spacers) 20 (not shown in FIG. 3) from an opening at the lower end thereof together with the gas stream. The spray nozzle pipe 18 is disposed on the mounting table 26 through a support unit (universal joint unit) 50 disposed at the center of the pipe 18 in the longitudinal direction thereof and can be swung in any of the X-axis direction and the Y-axis direction shown in FIG. 2.

As shown in FIG. 3 and FIG. 4, the support unit 50 of the spray nozzle pipe 18 is equipped with a joint ring 58 in the center hole of a joint base 52 fixed to the mounting table 26, which is supported through two support pins 54 disposed in parallel with a Y-axis and ball bearings 56 having the support pins 54 inserted, so that the joint ring 58 can rotate on the Y-axis. Further, the joint ring 58 supports the spray nozzle pipe 18 in the center hole through two support pins 60 disposed in parallel with the X-axis and the ball bearings 62 having the support pins 60 inserted, so that the joint ring 58 can rotate on the X-axis. Accordingly, the spray nozzle pipe 18 can be swung in any of the X-axis direction and the Y-axis direction and cannot be rotated on the centerline thereof.

The adjustable joints 36 and 38 of the first joint unit 35 are attached to the upper end of the spray nozzle pipe 18 and couple the pipe 18 with the second joint units 32 and 34 disposed on the inner sides of the linear-moving actuator 28 and 30 shown in FIG. 2 through the rods 40 and 42. As shown in FIG. 3 and FIG. 5, the adjustable joints (universal joints) 36 and 38 are attached to the upper end of the spray nozzle pipe 18 so as to project toward both the sides of the upper end in the X-axis direction. They are composed of two rotary rings 68 mounted on the upper end of the spray nozzle pipe 18 through ball bearings 66 which rotate in a horizontal direction and a joint arm 72 connected to the rotary rings 68 through ball bearings 70. When it is not necessary to so much increase the inclining angle of the spray nozzle pipe 18, spherical joints using spherical bearings may be employed in place of the adjustable joints 36 and 38 of the first joint unit 35 as the universal joints.

The rod 40 (42) is fixed to the joint arm 72 and coupled with the second joint unit 32 (34) of the linearly-moving actuator 28 (30) through the rod 40 (42), so that the movement of the linearly-moving actuator 28 (30) is transmitted to the spray nozzle pipe 18. The adjustable joints of the second joint units 32 and 34 of the linearly-moving actuators 28 and 30 may be the same as the adjustable joints 36 and 38, or any adjustable joints such as spherical joints may be employed.

The joint base 52 is fixed to the mounting table 26 through a mounting ring 74. The mounting ring 74 has an adjusting mechanism 76 for adjusting the position of the spray nozzle pipe 18. The lower end of the spray nozzle pipe 18 is inserted into a rubber cover 78 for hermetically sealing the chamber 12 as well as permitting the spray nozzle pipe 18 to swing. The outer periphery of the rubber cover 78 is fixed to the mounting table 26 through a fixing ring 80. When the spray mechanism 22 is driven, there is a possibility that dust and dirt are generated from the support unit 50 of the spray nozzle pipe 18 and the like although their amount may be negligible. The rubber cover 78 is attached to prevent the invasion of the dust and dirt other than the spacers into the chamber 12.

In the spray mechanism 22 arranged as described above for spraying the spacers 20, the spray nozzle pipe 18 is swung as described below by the movement of the linearly-moving actuator 28 (30), more specifically, by the movement of the slider 28a (30a) thereof along the guide 28b (30b).

Figure 6A:
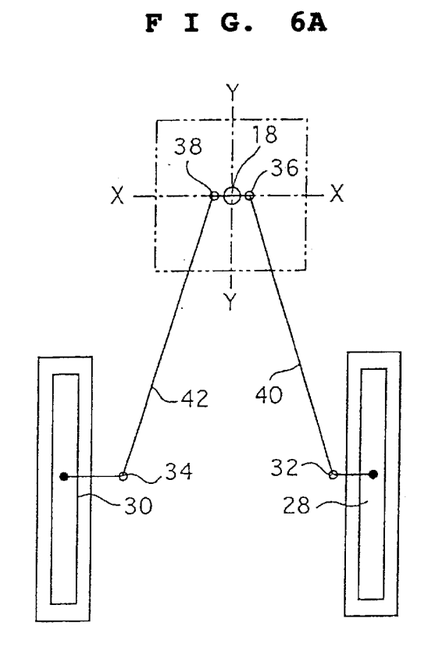
FIGS. 6A, 6B, 6C and 6D are illustrative views showing the swing of the spray nozzle pipe by the movements of the linearly-moving actuators in the finely-divided powder spray apparatus of the present invention.
Figure 6B:
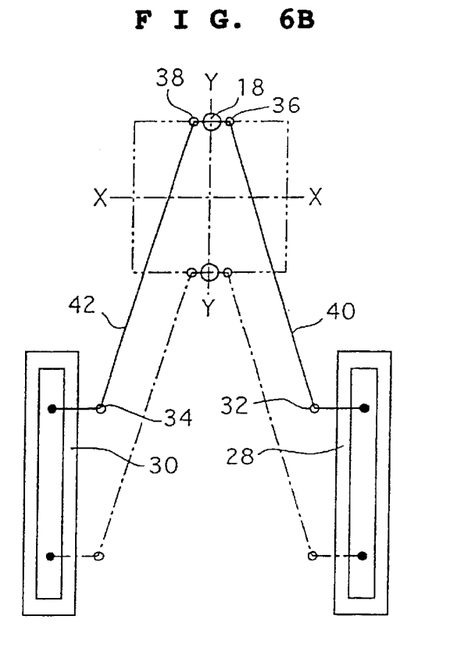
Figure 6C:
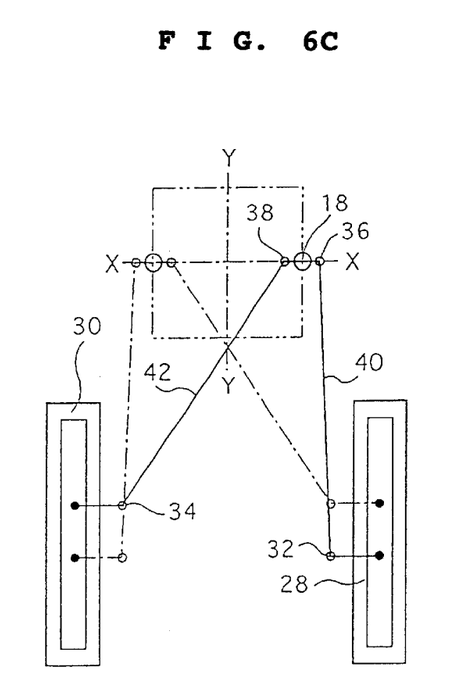
Figure 6D:
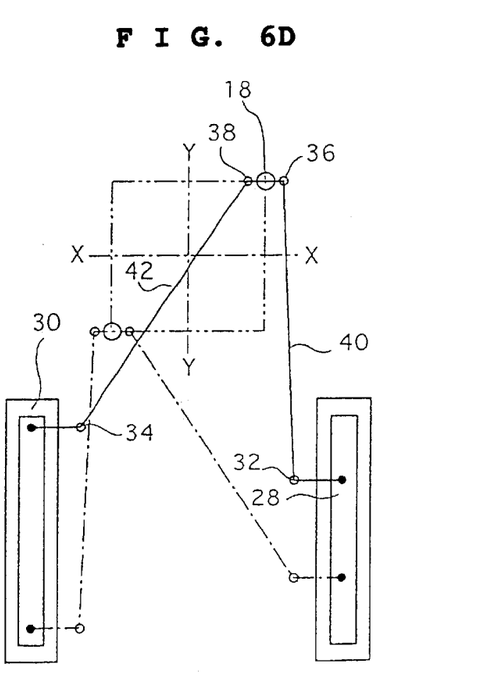

FIGS. 6A to 6D are illustrative views showing the swing of the spray nozzle pipe 18 by the movements of the slider 28a (30a) of the linearly-moving actuator 28 (30), respectively. FIG. 6A shows the spray nozzle pipe 18 being located at the center (vertical position) of a moving area. FIG. 6B shows the positions of the linearly-moving actuators 28 and 30, more specifically, the positions of the sliders 28a and 30a of the linearly-moving actuators 28 and 30 when the spray nozzle pipe 18 is swung to the limit position of the moving area in the Y-axis direction. FIG. 6C shows the positions of the linearly-moving actuators 28 and 30 (sliders 28a and 30a) when the spray nozzle pipe 18 is swung to the limit position of the moving area in the X-axis direction. FIG. 6D shows the spray nozzle pipe 18 being located in the corner of the moving area.

As illustrated in FIGS. 6A, 6B and 6C, when the spray nozzle pipe 18 is swung in the Y-axis direction, two linearly-moving actuators 28 and 30 simultaneously move in the same direction, and when the spray nozzle pipe 18 is swung in the X-axis direction, the two linearly-moving actuators 28 and 30 simultaneously move in the opposite direction each other. When the spray nozzle pipe 18 is swung at any other angle, it can be moved at any rate in the X-axis direction and the Y-axis direction by synthesizing the moving direction and speed of the two linearly-moving actuators 28 and 30, whereby the spacers 20 can be sprayed out to any position of the glass substrate 16.

Figure 7:
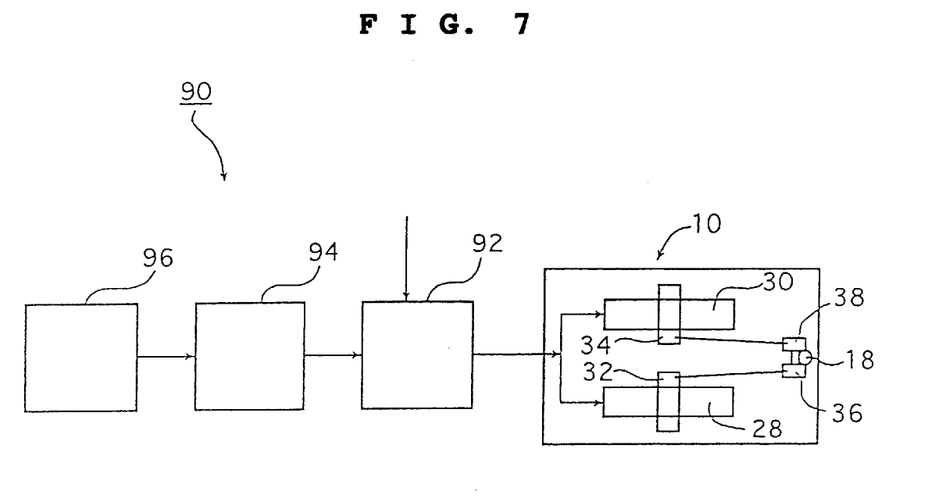
FIG. 7 is an illustrative view showing the system configuration of the finely-divided powder spray system including the spacer spray apparatus of the present invention.

FIG. 7 is a schematic view showing a system configuration of a finely-divided powder spray system 90 including a spacer spray apparatus 10. The finely-divided powder spray system 90 is composed of the spray apparatus 10, an actuator driver 92 electrically connected to the spray apparatus 10, more specifically, to the linearly-moving actuators 28 and 30 of the spray mechanism 22 for controlling them, a sequencer 94 electrically connected to the driver 92, and a touch panel 96 electrically connected to the sequencer 94 for operating the spray apparatus 10, especially entering the control factor to swing the sequencer 94.

It is described below how the spacers 20 are sprayed onto the glass substrate 16. Before the spacers 20 are sprayed onto the glass substrate 16, the spacers 20 must be sprayed onto a sample glass substrate 16 by way of trial. In this case, data such as a locus along which the spray nozzle pipe 18 moves, a size of the glass substrate 16 (width×height: for example, 720 cm×600 cm) and a condition for spraying the spacers 20 is entered by the touch panel 96.

Figure 8:
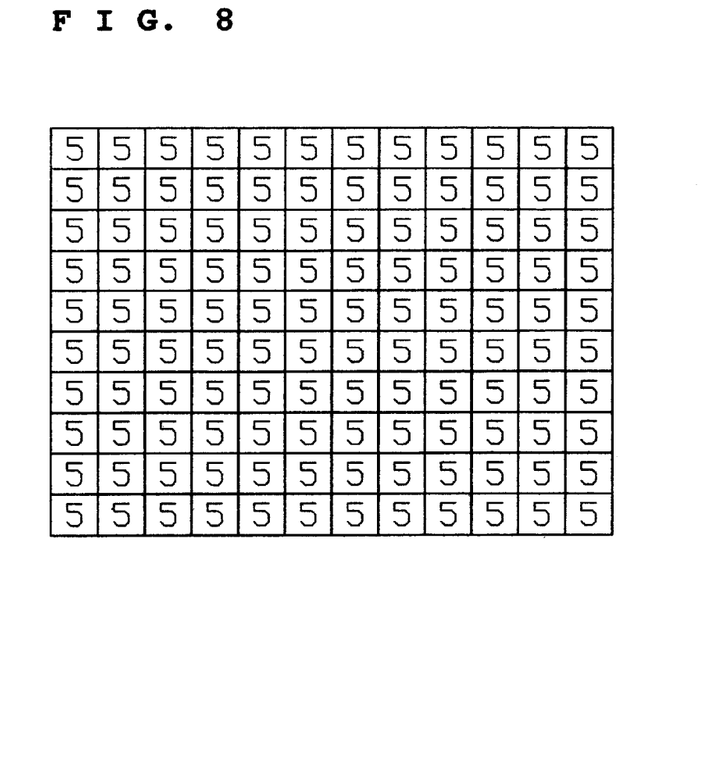
FIG. 8 is an illustration showing the spray conditions for spraying the finely-divided powders in a trial spray using the spacer spray apparatus of the present invention.

FIG. 8 is an illustration showing the conditions for spraying the sample spacers 20 in a trial spray. As shown in the figure, the surface of the glass substrate 16 to be sprayed are divided into a matrix of 12×10 (row×column) lattice-like areas, and a control factor C is entered for each lattice-like area to make the conditions in a trial spray. The control factor "5", indicates that no correction is made to the spray condition. Any of the control factors "6"–"9" indicates that the correction is made so as to increase a spray density (so as to decrease the moving-speed of the tip of the spray nozzle pipe) as a larger factor is specified. Any of the control factors "1"–"4" indicates that the correction is made so as to decrease the spray density (so as to increase the moving-speed of the tip of the spray nozzle pipe) as a smaller factor is specified. Since no correction is made in the trial spray, the control factor "5" is entered for all the 12×10 (row×column) lattice-like areas.

The entered data such as the locus along which the spray nozzle pipe 18 moves, the size of the glass substrate 16, and the condition for spraying the spacers 20 is transferred through the sequencer 94 to the actuator driver 92, which in turn determines the locus to be drawn by an extension from the tip of the spray nozzle pipe in the X-Y coordinate system on the glass substrate 16. An origin of the X-Y coordinate system, in which corresponding locations on the glass substrate 16 are represented, is assumed to be an intersection of the perpendicularly-directed extension from the tip of the spray nozzle pipe 18 and the glass substrate 16. The locus drawn by the extension from the tip of the spray nozzle pipe 18 on the glass substrate 16 can be determined as a continuity of plural control points $((x_1, y_1), (x_2, y_2), (x_3, y_3), (x_4, y_4), \ldots (x_n, y_n))$.

The actuator driver 92 calculates an incline angle of the spray nozzle pipe 18 in the X-Y direction from the locus drawn in the X-Y coordinate system on the glass substrate 16, and converts the control points in the X-Y coordinate system into the corresponding positions of the sliders 28a and 30a of the linearly-moving actuators 28 and 30 in the L1–L2 coordinate system $((L1_1, L2_1), (L1_2, L2_2), (L1_3, L2_3), (L1_4, L2_4), \ldots (L1_n, L2_n))$. In the L1–L2 coordinate system, sliding positions of the sliders 28a and 30a of the linearly-moving actuators 28 and 30 are represented.

Next, the actuator driver 92 operates the spacer spray apparatus 10, and changes the incline angle of the spray nozzle pipe 18 so as to shift the spray position along the determined locus at a temporary speed (V) while sequentially moving the sliders 28a and 30a of the linearly-moving actuators 28 and 30 to the positions $((L1_1, L2_1), (L1_2, L2_2), (L1_3, L2_3), (L1_4, L2_4), \ldots (L1_n, L2_n))$, whereby the spacers 20 are sprayed onto the sample glass substrate 16 in the trial spray.

Figure 9:
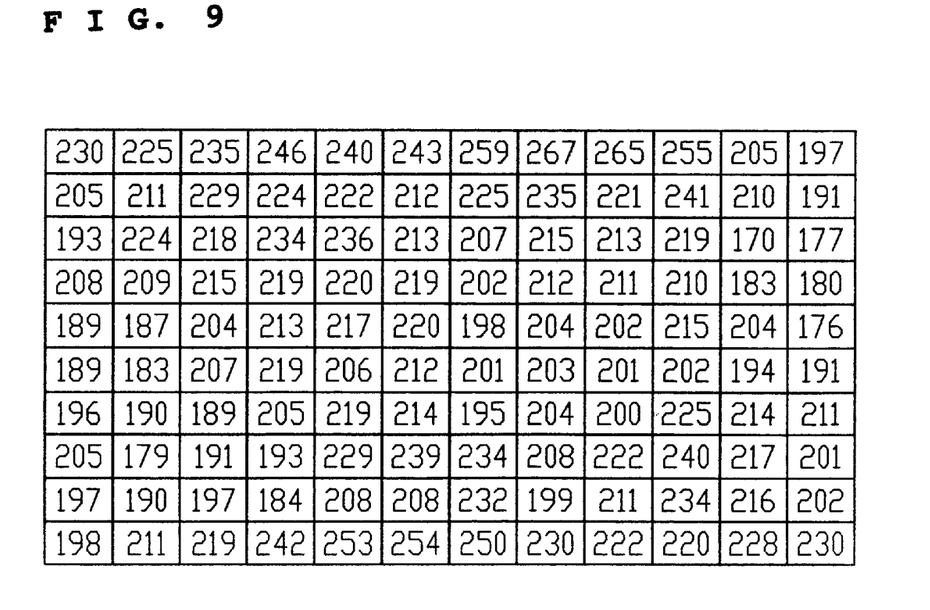
FIG. 9 is a table showing the measured densities of the deposited spacers in the individual lattice-like areas of the whole surface of the glass substrate, the spacers being sprayed by the spacer spray apparatus of the present invention in the trial spray.
Figure 10:
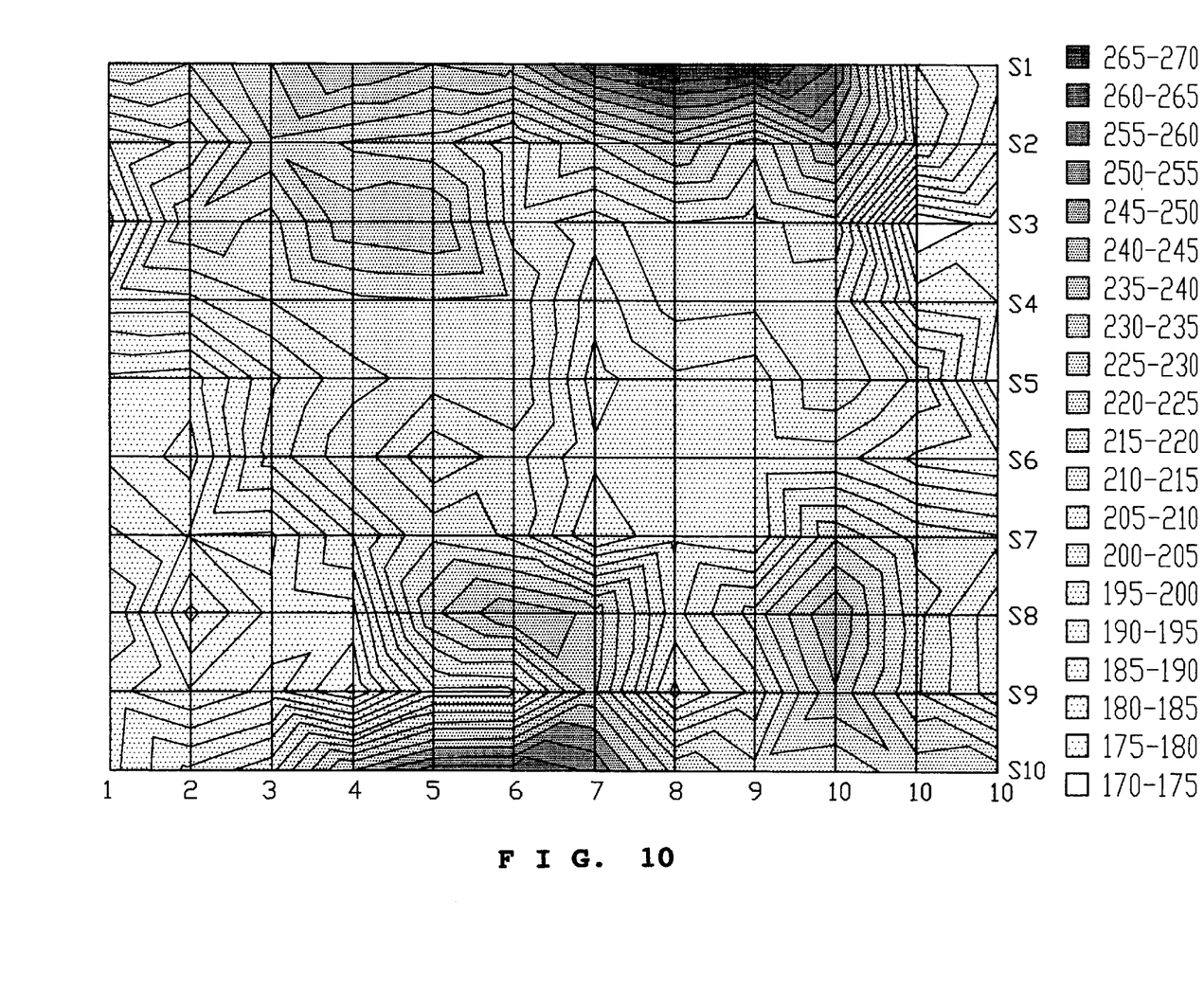
FIG. 10 is a graph showing the distribution of the densities of the deposited spacers on the whole surface of the glass substrate, the spacers being sprayed by the spacer spray apparatus of the present invention in the trial spray.

After the trial spray, densities of the spacers 20 deposited on the sample glass substrate 16 are measured by a spacer counter (not shown in the figure). FIG. 9 is a table showing measured values (spacers/mm$^2$) of densities of the deposited spacers 20 in all the 12×10 (row×column) lattice-like areas, the spacers being sprayed on the whole surface of the substrate 16 having a size of 20 cm×600 cm, (the densities are measured at the centers of the lattice-like areas). FIG. 10 is a graph showing a distribution of the densities of the deposited spacers (spacers/mm$^2$) on the whole glass substrate 16 based on the measured values shown in FIG. 9.

The conditions for spraying the spacers 20 are then entered by the touch panel 96 with reference to the graph of FIG. 10 showing the distribution of the spacers deposited on the whole surface of the glass substrate 16.

Figure 11:
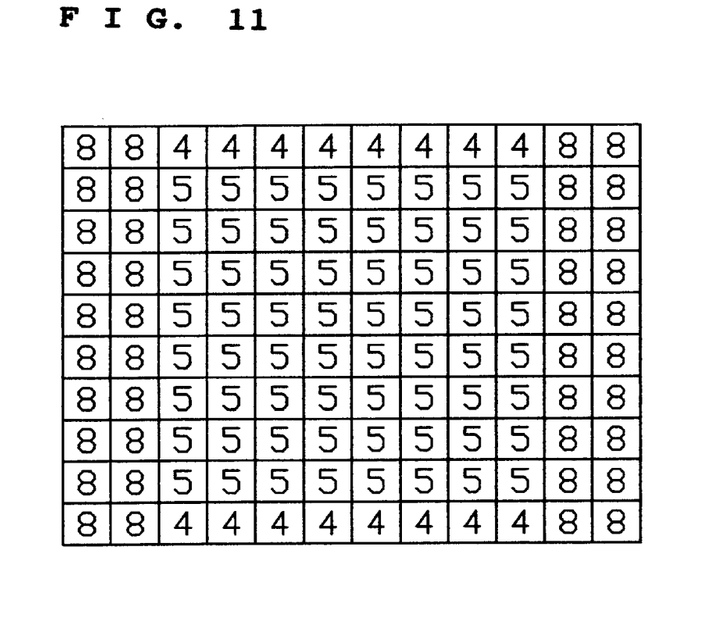
FIG. 11 is an illustrative view showing the conditions for spraying the spacers by the spacer spray apparatus of the present invention.

As seen in this graph of the distribution of the densities, the densities are low in the right and left parts of the glass substrate 16 whereas the densities are high in the upper and lower parts thereof, and therefore, the values of the spray conditions are entered as shown in FIG. 11. In other words, since the densities of the deposited spacers are low in the right and left parts of the glass substrate 16, the control factor "8" (indicating that the correction is made so as to increase the density (so as to decrease the moving-speed of the tip of the spray nozzle pipe)) is entered, and since the densities of the deposited spacers are high in the upper and lower parts of the glass substrate 16, the control factor "4" (indicating that the correction is made so as to decrease the density (so as to increase the moving-speed of the tip of the spray nozzle pipe)) is entered.

Subsequently, the actuator driver 92 calculates the moving-speed of a spray point, at which the extension of the spray nozzle pipe 18 intersects with the glass substrate 16 between control points in the X-Y coordinate system. The moving-speed of the spray point between the control points $(x_1, y_1)$ and $(x_2, y_2)$ is determined depending on where the control point $(x_1, y_1)$ is located among the 12×10 lattice-like areas of the glass substrate 16. In other words, the moving-speed of the spray point between the control points $(x_1, y_1)$ and $(x_2, y_2)$ is calculated by multiplying the moving-speed (temporary speed V) of the spray point in the trial spray by the control factor entered for the area of the control point $(x_1, y_1)$. In the case that the control factor entered for the area of the control point $(x_1, y_1)$ is $C_1$ (any of "1"–"9"), the moving-speed can be calculated by the expression $(C_1 \times V)$.

In the same manner, the moving-speed of the spray point between the control points $(x_2, y_2)$ and $(x_3, y_3)$ is determined depending on where the control point $(x_2, y_2)$ is located among the 12×10 lattice-like areas of the glass substrate 16. If the control factor entered for the area of the control point $(x_2, y_2)$ is $C_2$ (any of "1"–"9"), the moving-speed of the spray point between $(x_2, y_2)$ and $(x_3, y_3)$ can be calculated by the expression $(C_2 \times V)$. Further, the moving-speed $(C_3 \times V)$ of the spray point between $(x_3, y_3)$ and $(x_4, y_4)$, and the moving-speed $(C_{n-1} \times V)$ of the spray point between $(x_{n-1}, y_{n-1})$ and $(x_n, y_n)$ can also be calculated in the same manner.

The actuator driver 92 further calculates the moving-speeds of the sliders 28a and 30a of the linearly-moving actuator 28 and 30 based on a distance between the control points and the moving-speed of the spray point in the X-Y coordinate system. More specifically, the actuator driver 92 calculates the moving-speeds of the sliders 28a and 30a of the linearly-moving actuator 28 and 30 between $(L1_1, L2_1)$ and $(L1_2, L2_2)$, based on a distance between the control points $(x_1, y_1)$ and $(x_2, y_2)$ and the moving-speed $(C_1 \times V)$ of the spray point between the control points $(x_1, y_1)$ and $(x_2, y_2)$. In the same manner, the actuator driver 92 calculates the moving-speeds of the sliders 28a and 30a of the linearly- moving actuator 28 between $(L1_2, L2_2)$ and $(L1_3, L2_3)$, between $(L1_3, L2_3)$ and $(L1_4, L2_4)$, and between $(L1_{n-1}, L2_{n-1})$ and $(L1_n, L2_n)$, respectively.

Next, the glass substrate 16, onto which the finely-divided powders is actually sprayed, is positioned and fixed on the table 14 installed in the hermetically-sealed chamber 12. The glass substrate 16 must be fixed at the same position as the sample glass substrate used in the trial spray of the spacers 20.

Next, the actuator driver 92 operates the spacer spray apparatus 10 to spray the spacers 20 on the glass substrate 16 while sequentially moving the sliders 28a and 30a of the linearly-moving actuators 28 and 30 to the points $(L1_1, L2_1)$, $(L1_2, L2_2)$, $(L1_3, L2_3)$, $(L1_4, L2_4)$, ... $(L1_n, L2_n)$ at the calculated speed. Accordingly, the spacers 20 can be sprayed onto the glass substrate 16 while shifting the spray point between the control points $(x_1, y_1)$ and $(x_2, y_2)$ at the moving-speed of $(C_1 \times V)$, the spray point between the control points $(x_2, y_2)$ and $(x_3, y_3)$ at the moving-speed of $(C_2 \times V)$, the spray point between the control points $(x_3, y_3)$ and $(x_4, y_4)$ at the moving-speed of $(C_3 \times V)$, and the spray point between the control points $(x_{n-1}, y_{n-1})$ and $(X_n, y_n)$ at the moving-speed of $(C_{n-1} \times V)$, respectively.

Figure 12:
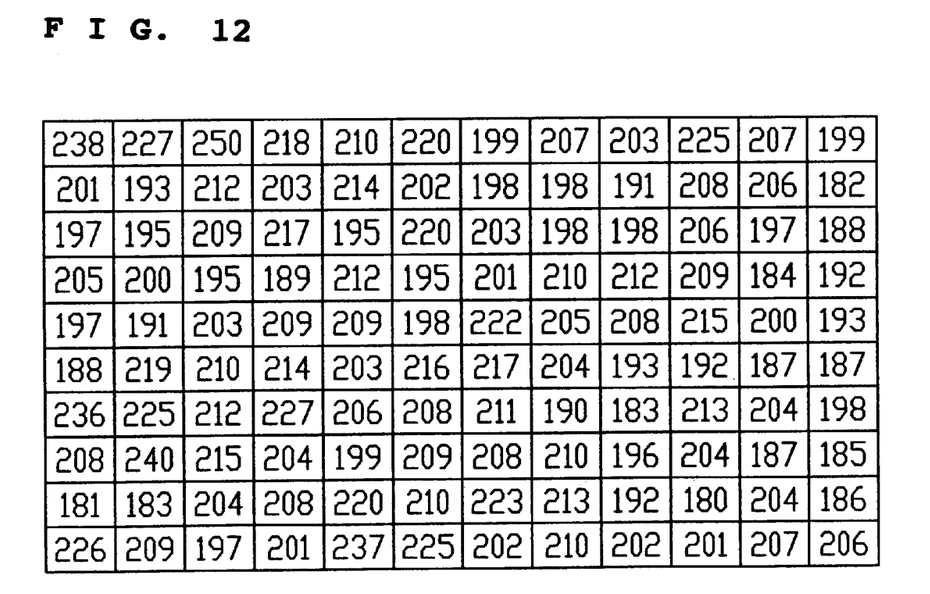
FIG. 12 is a table showing the densities of the deposited spacers in the individual lattice-like areas, the spacers being sprayed by the spacer spray apparatus of the present invention.
Figure 13:
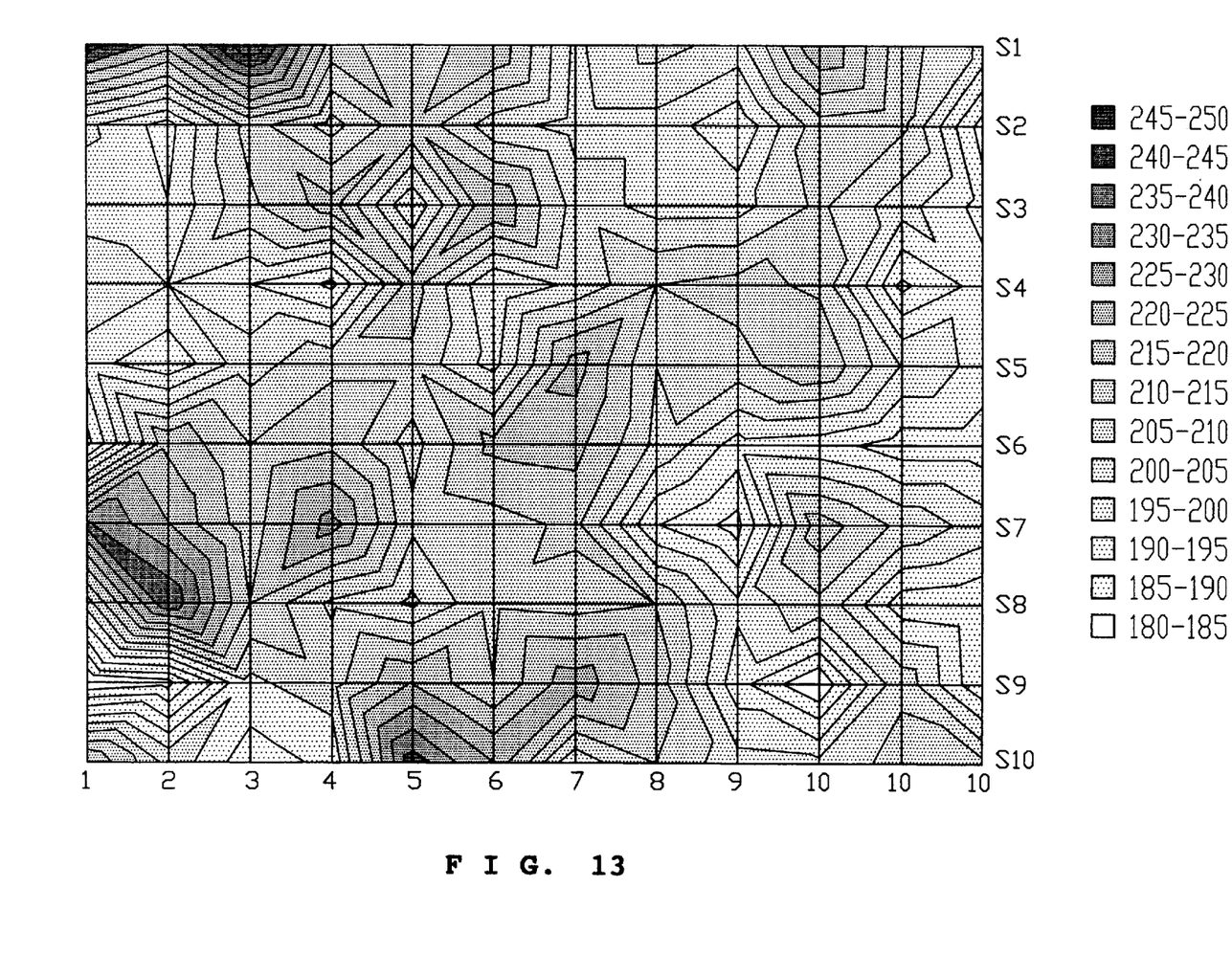
FIG. 13 is a graph showing the distribution of the densities of the deposited spacers on the whole surface of the glass substrate, the spacers being sprayed by the spacer spray apparatus of the present invention.

FIG. 12 is a table showing the measured densities of the spacers (spacers/mm$^2$) deposited in the individual 12×10 (row×column) lattice-like areas on the whole surface of the glass substrate 16 when spraying the spacers 20 on the glass substrate 16 in accordance with the entered spray conditions (the densities of the spacers 20 were measured at the centers of the lattice-like areas). FIG. 13 is a graph showing a distribution of the densities of the deposited spacers 20 on the whole surface of the glass substrate 16 based on the measured densities of the deposited spacers 20 shown in FIG. 12. As apparent from the measured values shown in FIG. 13, the moving-speed of the tip of the spray nozzle pipe 18 is locally controlled, the spacers 20 can be uniformly sprayed on the whole surface of the glass substrate 16. After one glass substrate 16 has been sprayed with the spacers 20, another glass substrate 16 will be sprayed with the spacers 20 subsequently in the same manner.

According to the spacer spray apparatus 10 of the present invention, the control factors are entered individually for the prescribed areas. For example, depending on the measurement results, the control factor is entered for decreasing the moving-speed of the tip of the spray nozzle pipe 18 in the prescribed area in which the density of the deposited spacers is low, whereas the control factor is entered for increasing the moving-speed of the tip of the pipe 18 in the other prescribed area in which the density of the deposited spacers is high, whereby the spray densities of the spacers 20 deposited on the whole surface of the glass substrate 16 can be uniform.

In the aforementioned embodiment, the spacer spray apparatus 10 sprays the spacers 20 onto the glass substrate 16 positioned and horizontally fixed on the table 14 by swinging the spray nozzle pipe 18 disposed above the glass substrate so that the spacers 20 are uniformly sprayed downward. However, the present invention is by no means limited to the aforementioned embodiment. Any types of finely-divided powders which should be a uniformly sprayed can be used, for example, powder paints, toner, etc. in addition to the spacers. Any members to be sprayed can also be used, for example, objects to be coated by powder paints in addition to the glass substrate. They are not limited to those horizontally fixed on the table 14, and can be, for example, those not mounted on the table, vertically-disposed substrates and parts to be painted, and inclined substrates and parts to be painted. The direction in which the spacers are sprayed onto the member to be sprayed is also not limited to the aforementioned embodiment and the spacers may be sprayed onto the horizontally-disposed or inclined member in any of the perpendicularly-downward and oblique directions as well as onto the vertically-disposed or inclined member in any of the horizontal and oblique directions.

In the aforementioned embodiment, the spray nozzle pipe 18 is swung in the X-axis direction and the Y-axis direction by controlling the sliders 28a and 30a of the linearly-moving actuators 28 and 30. However, the present invention may be applied to a spacer display apparatus of which spray nozzle pipe 18 is swung in the X-axis direction and the Y-axis direction through a crank or an eccentric cam linked to the motor.

Further in the aforementioned embodiment, the surface of the glass substrate 16 to be sprayed is divided into 12×10 lattice-like areas, for which the control factors are individually entered to control the moving-speed of the tip of the spray nozzle pipe 18. However, the number of the divided areas may be varied, if necessary.

According to the present invention, the control factors may be entered by the control factor entry means individually for the prescribed areas of the member to be sprayed, and thus the density of the deposited finely-divided powders may be partially changed easily by the touch panel and the like.

What is claimed is:

1. A finely-divided powder spray apparatus having a spray nozzle discharge pipe means for discharging finely-divided powders from the tip together with a gas flow, which is disposed at a prescribed distance from a member to be sprayed, the finely-divided powder spray apparatus comprising:

a control-factor entry means for entering control factors to control the moving speed of a tip of the spray nozzle discharge pipe means in a prescribed area of the member to be sprayed; and a moving-speed control means for controlling the moving-speed of the tip of the spray nozzle discharge pipe means in the prescribed area of the member to be sprayed based on the control factors entered by the control-factor entry means, wherein the prescribed area of the member to be sprayed is a lattice-shaped divided area of a surface of the member to be sprayed.

2. The finely-divided powder spray apparatus according to claim 1, wherein the control-factor entry means enters the control factors for each prescribed area of the member to be sprayed and the moving-speed control means controls the moving speed of the tip of the spray nozzle discharge pipe means dependent on the area of a spray point on the member to be sprayed, based on the control factors entered for the prescribed area.

3. The finely-divided powder spray apparatus according to claim 1, wherein the member to be sprayed is a substrate of liquid crystal displays and the finely-divided powders are spacers for the liquid crystal displays.

4. The finely-divided powder spray apparatus according to claim 2, wherein the member to be sprayed is a substrate of liquid crystal displays and the finely-divided powders are spacers for the liquid crystal displays.

5. A finely-divided powder spray apparatus having a spray nozzle pipe configured to discharge finely-divided powders from the tip together with a gas flow, which is disposed at a prescribed distance from a member to be sprayed, the finely-divided powder spray apparatus comprising:

a control-factor entry member configured to enter control factors to control the moving speed of a tip of the spray nozzle pipe in a prescribed area of the member to be sprayed; and a moving-speed control member to control the moving-speed of the tip of the spray nozzle pipe in the prescribed area of the member to be sprayed based on the control factors entered by the control-factor entry member, wherein the prescribed area of the member to be sprayed is a lattice-shaped divided area of a surface of the member to be sprayed.

6. The finely-divided powder spray apparatus according to claim 5, wherein the control-factor entry member enters the control factors for each prescribed area of the member to be sprayed and the moving-speed control member controls the moving speed of the tip of the spray nozzle pipe dependent on the area of a spray point on the member to be sprayed, based on the control factors entered for the prescribed area.

7. The finely-divided powder spray apparatus according to claim 5, wherein the member to be sprayed is a substrate of liquid crystal displays and the finely-divided powders are spacers for the liquid crystal displays.

8. The finely-divided powder spray apparatus according to claim 6, wherein the member to be sprayed is a substrate of liquid crystal displays and the finely-divided powders are spacers for the liquid crystal displays.

* * * * *